US009286720B2

(12) United States Patent
Werling et al.

(10) Patent No.: US 9,286,720 B2
(45) Date of Patent: Mar. 15, 2016

(54) LOCATIVE VIDEO FOR SITUATION AWARENESS

(75) Inventors: Michael Thomas Werling, Ashburn, VA (US); Kenneth David Feldman, Arlington, VA (US); Raymond E. Bivens, Elizabeth, CO (US)

(73) Assignee: NORTHROP GRUMMAN SYSTEMS CORPORATION, Los Angeles, CA (US)

( * ) Notice: Subject to any disclaimer, the term of this patent is extended or adjusted under 35 U.S.C. 154(b) by 788 days.

(21) Appl. No.: 12/544,298

(22) Filed: Aug. 20, 2009

(65) Prior Publication Data

US 2011/0043627 A1 Feb. 24, 2011

(51) Int. Cl.
*G06T 19/00* (2011.01)
*G06T 17/05* (2011.01)

(52) U.S. Cl.
CPC .............. *G06T 19/006* (2013.01); *G06T 17/05* (2013.01)

(58) Field of Classification Search
CPC .............................. G06T 17/05; G06T 19/006
USPC ......... 382/106, 107, 286, 294, 299, 300, 308, 382/190, 192, 194, 195, 205, 209, 217–220, 382/224, 225, 254, 276, 278, 103; 348/135–160, 169–172
See application file for complete search history.

(56) References Cited

U.S. PATENT DOCUMENTS

| | | | | |
|---|---|---|---|---|
| 6,157,896 A * | 12/2000 | Castles et al. | .................... | 702/95 |
| 6,597,818 B2 * | 7/2003 | Kumar et al. | ................. | 382/294 |
| 6,940,538 B2 * | 9/2005 | Rafey et al. | .................... | 348/157 |
| 7,383,129 B1 * | 6/2008 | Baillot et al. | ..................... | 702/2 |
| 7,391,424 B2 * | 6/2008 | Lonsing | ......................... | 345/633 |
| 7,933,395 B1 * | 4/2011 | Bailly et al. | ............. | 379/201.04 |
| 8,250,052 B2 * | 8/2012 | Barnett | ....................... | 707/706 |
| 2009/0237510 A1 * | 9/2009 | Chen et al. | .................... | 348/159 |

* cited by examiner

*Primary Examiner* — Behrooz Senfi
*Assistant Examiner* — Maria Vazquez Colon
(74) *Attorney, Agent, or Firm* — Andrews Kurth LLP; Sean S. Wooden

(57) ABSTRACT

An exemplary system and method are disclosed for providing a combined video stream with geospatial information. Embodiments use a visualization tool to synchronize information in a virtual camera with attributes, such as video frames, from a physical camera. Once the camera position information is supplied to the visualization tool, the visualization tool retrieves geospatial data, such as terrain features, man made features, and time sensitive event data, and transforms the camera position information into a coordinate system of the virtual camera. The visualization tool uses the coordinate system of the virtual camera to generate geospatial snapshots. Embodiments use locative video software to combine the video frames from the physical camera with the geospatial snapshots from the virtual camera to generate a combined video stream, which provides a single view of multiple types of data to enhance an operator's ability to conduct surveillance and analysis missions.

27 Claims, 5 Drawing Sheets

LOCATIVE VIDEO FOR SITUATION AWARENESS

BACKGROUND

Ubiquitous video and persistent surveillance are trends in the security and intelligence community. Operators may view video over long time periods from multiple sources. Moreover, surveillance is increasingly used in many domains. Persistent surveillance in cities and other populated areas supports anti-terror efforts and law enforcement both in real-time monitoring and forensic analysis. Similarly, military applications are increasing the use of unmanned aerial vehicles (UAV) and other platforms for gathering real time intelligence, and using video products information platforms to enhance analysis of events and trends. However, currently operators typically view video sources, i.e., monitoring applications, independent of other information regarding the video sources, such as information provided by metadata. This other information is usually displayed on the periphery of the monitoring applications.

Current solutions combining video and other information include Great Circle Technologies Minerva™ and Merlin's AutoFMV Workflow™, which provide transparent overlays of geospatial intelligence data. This approach uses ortho-rectification of the video stream to determine the geospatial coverage of the video frames. However, ortho-rectification is a complex process and is typically only suited for downward looking video streams, for example, from airborne platforms such as a UAV.

Another current solution is Nokia Mobile's augmented reality application. While this research project shows virtual features overlain on video, the Nokia application is restricted to a particular mobile phone platform and does not have generic camera and geospatial application support. For example, the Nokia application is designed to work on a unified sensor, video, and visualization platform based on a mobile phone. The Nokia application is not able to operate with distributed video, mapping, and viewing components that may be connected across any available network without being tied to one device. Additionally, the Nokia application performs analysis of the actual video stream to determine the location of an object based on the offset from the known camera position and the results of the analysis, which is a time consuming, complex operation. Further, the Nokia application draws graphics directly onto the video display by using simple line graphics and text to represent objects, accordingly limiting the types of data that can be used to populate the overlay.

SUMMARY

A system for providing a combined video stream with geospatial information includes a camera that provides a video stream and camera position information and a computer. The computer includes locative video software that receives video frames of the video stream and the camera position information from the camera, and a visualization tool including a virtual camera and a virtual visualization space. The visualization tool receives the camera position information from the locative video software, retrieves geospatial data from a geospatial data repository, and uses the camera position information and the geospatial data to position the virtual camera within the virtual visualization space. The virtual camera provides a view mimicking that of the camera. The locative video software requests geospatial snapshots of the virtual camera's view from the visualization tool, and combines the video frames and the geospatial snapshots to generate a combined video stream. The combined video stream includes position information of one or more features in the video frames and nearby landmarks.

A method for providing a combined video stream with geospatial information includes receiving video frames and camera position information from a camera, providing the camera position information to a visualization tool that is executed by the processor, retrieving geospatial data from a geospatial data repository using the visualization tool, and positioning a virtual camera within a virtual visualization space of the visualization tool, using the camera position information and the geospatial data. The virtual camera provides a view mimicking that of the camera. The method further includes requesting geospatial snapshots of the virtual camera's view from the visualization tool, and combining the video frames and the geospatial snapshots to generate a combined video stream using the locative video software. The combined video stream includes position information of one or more features in the video frames and nearby landmarks.

A computer readable medium provides instructions for providing a combined video stream with geospatial information. The instructions include receiving video frames and camera position information from a camera, providing the camera position information to a visualization tool that is executed by the processor, retrieving geospatial data from a geospatial data repository using the visualization tool, and positioning a virtual camera within a virtual visualization space of the visualization tool, using the camera position information and the geospatial data. The virtual camera provides a view mimicking that of the camera. The instructions farther include requesting geospatial snapshots of the virtual camera's view from the visualization tool, and combining the video frames and the geospatial snapshots to generate a combined video stream using the locative video software. The combined video stream includes position information of one or more features in the video frames and nearby landmarks.

DESCRIPTION OF THE DRAWINGS

The detailed description will refer to the following drawings, wherein like numerals refer to like elements, and wherein.

DETAILED DESCRIPTION

Figure 1:
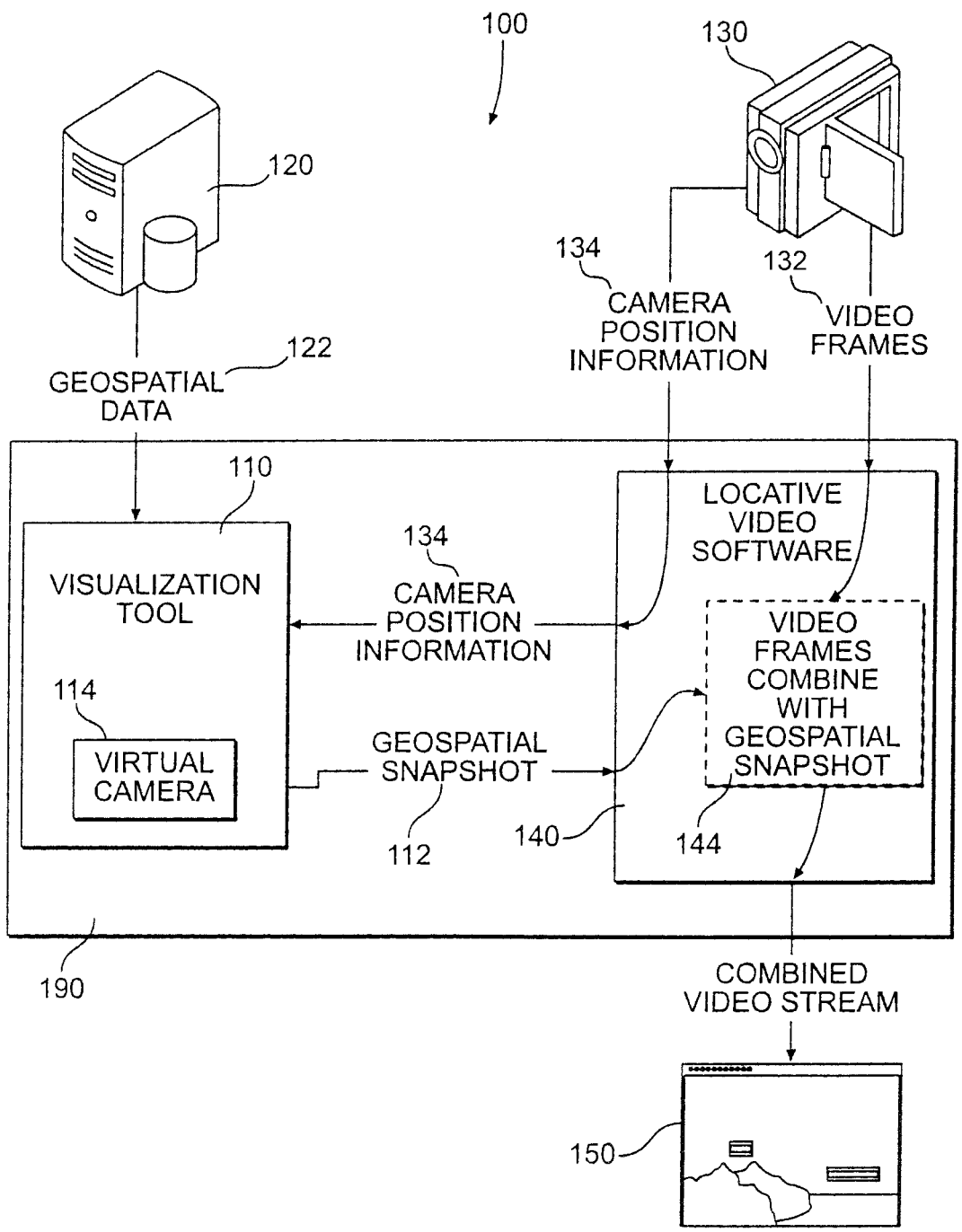
FIG. 1 illustrates an embodiment of a system for providing a combined video stream with geospatial information.

As noted above, surveillance operators may view video over long time periods from multiple sources and video surveillance is increasingly used in many domains. An exemplary system and method are disclosed for providing a combined video stream with geospatial information. Embodiments use a visualization tool to synchronize information in a virtual camera with attributes, such as video frames, from a physical camera. Once the camera position information, such as information regarding the camera's position, orientation, and field of view (FOV), is supplied to the visualization tool, the visualization tool retrieves geospatial data, such as terrain features, man made features, and time sensitive event data, and transforms the camera position information into a coordinate system of the virtual camera. The visualization tool uses the coordinate system of the virtual camera to generate geospatial snapshots. Embodiments use locative video software to combine the video frames from the physical camera with the geospatial snapshots from the virtual camera to generate a combined video stream, which provides a single view of multiple types of data to enhance an operator's ability to conduct surveillance and analysis missions. For example, embodiments generate and insert labels providing additional information into the combined video stream. Examples of labels include road name, unit strength, and event type.

Embodiments avoid complex operations for ortho-rectification of the actual frames of a video stream that would otherwise be necessary to intersect video stream with geospatial data. Ortho-rectification is a process that takes an image and applies transformations and distortions so that the geometry in the image matches the geometry of the Earth's surface the image represents. The ortho-rectification process places each pixel of the image in its precise geographic position using mathematical calculations that account for the source camera position, orientation, and lens characteristics. Ortho-rectification has traditionally been done on still images, often still images of very high resolution. Recently the process has been adapted to frames of video feeds, allowing the video to be accurately displayed on map visualizations.

Embodiments of the system and method instead use a simpler and lighter weight approach to determine geospatial information of the video stream by mimicking camera attributes in a virtual camera. Instead of ortho-rectifying the image frames of the video to align with the geospatial features, the geospatial features are transformed mathematically to match the image frames. A software-driven virtual camera is placed in a three-dimensional scene of the world with geospatially-aligned features such as roads, buildings or moving vehicles. By aligning the virtual camera's position, orientation and field of view to match the physical camera's position, orientation and field of view, a virtual scene is created that matches the real-world view of the physical camera. The underlying geospatial features in the virtual world become aligned with their physical world counterparts once the two images are intersected. Embodiments may function for both downward looking sources and sources that look out at other angles and contain horizon or skyline, such as surveillance cameras on fixed masts or vehicles.

Embodiments are designed to operate with distributed video, mapping, and viewing components that may be connected across any available network, without being tied to one device. Embodiments do not need to, and do not, perform analysis of the actual video stream in order to provide geospatial information in a combined video stream. Likewise, embodiments utilize visualization software as an external source for video overlay, while the above-described Nokia application draws objects and other things directly to the screen as graphics. Accordingly, the present embodiments provide greater flexibility as to what we can displayed, while Nokia is limited to graphics that it can draw on the screen. Embodiments of the visualization tool provide the location of all elements using the geospatial data from the geospatial data source, such as a geospatial data repository.

FIG. 1 illustrates an embodiment of a system 100 for providing a combined video stream with geospatial information. The system 100 includes a visualization tool 110 that may reside in a memory of the computer 190 and executed by a processor of the computer 190. The visualization tool 110 may be embodied as software that includes instructions for performing steps described herein. The computer 190 may be the computer 500 shown in FIG. 5. The visualization tool 110 may retrieve geospatial data 122 from a geospatial data repository 120. The geospatial data repository 120 may be a local file or database, a remote database, a data service, or any other source that is supported by the visualization tool 110. The geospatial data 122 may be information regarding particular locations, such as terrain features, man-made features, and time sensitive event data, collected and visualized by an organization using geospatial information systems (GIS) and stored in a variety of formats and technologies. The geospatial data 122 is in a format that can be loaded into the visualization tool 110, which can be commercial software or open source geospatial software formats that support OpenGL. Specifically, the geospatial data 122 may be stored in a wide range of digital formats located on a machine local to the visualization application (e.g., visualization tool 110) or available across the network. Commonly used formats for locally stored data include shapefiles, Tagged Image File Format (TIFF), Joint Photographic Experts Group (JPEG), or in structured databases using technology from Environmental Science Research Incorporated (ESRI), Oracle, or Microsoft. Services available over the network generally use protocols proprietary to specific vendors, such as Environmental Systems Research Institute (ESRI), or comply with open standards, such as those published by the Open Geospatial Consortium (OGC). OGC standards include the Web Feature Service (WFS) and Web Mapping Service (WMS). By using an existing geospatial visualization application, the system 100 gains access to the majority of these data formats.

Prior to operation, the visualization tool 110 may be configured to view the geospatial data 122. The geospatial data 122 may be symbolized using appropriate icons and labels as supported by the visualization tool 110. The data to be shown in the final result may be displayed in the visualization tool 110.

The embodiment of the system 100 may further include locative video software 140 residing in a memory of the computer 190 and executed by a processor of the computer 190. As described below, the locative video software 140 may combine the real video frames from the video camera(s) 130 and the geospatial data from the visualization tool 110 to produce the system 100 output of video combined with geospatial information. As shown in FIG. 1, the visualization tool 110 and the locative video software 140 may reside on the same computer 190. One skilled in the art will readily appreciate that the visualization tool 110 and the locative video software 140 may reside on separate computers. As noted above, the computer 190 may be the computer 500 shown in FIG. 5. Components of the system 100 may operate on different computers. For example, video frames from the camera may be streamed to the locative video software 140 on any other networked computer. Additionally, the locative video software 140 may receive data frames from a virtual camera located anywhere on the network or Internet. In a similar fashion, the geospatial data may reside on yet another networked computer and be streamed to the visualization tool via the network or the Internet. In practice, this allows for a camera located anywhere in the world to stream video frames to the locative video software 140 anywhere else in the world, while the visualization tool may be located in yet a different place, receiving geospatial data from yet another location.

The embodiment of the system 100 may further include a camera 130 that provides video frames 132 of a video stream to the locative video software 140 using a standard video streaming format, for example. Different standards are available depending on the camera 130 and computing systems supported. The video frames 132 may show real time pictures of activities within the camera's field of view (FOV). Alternatively, the video frames 132 provided to the locative video software 140 may have been previously recorded. The camera 130 may also provide camera position and orientation information 134 to the locative video software 140. The camera position information 134 may include the camera's position, orientation, and FOV information, which may be either static information or dynamic information in the case of mobile or pan/tilt/zoom cameras.

The locative video software 140 may provide the camera position and orientation information 134 to the visualization tool 110. As visualization tools are not generally configured to directly receive such information, embodiments of the locative video software 140 manipulate the visualization tool 110 and this information so that the visualization tool 110 may receive and process the information as described herein. The visualization tool 110 may create an instance of (instantiate) a virtual camera 114 as a part of a OpenGL implementation within the visualization tool 110. A software-driven virtual camera 114 is placed in a three-dimensional scene of the world, generated by the visualization tool 110, with geospatially-aligned features such as roads, buildings or moving vehicles. By aligning the virtual camera 114 position and orientation to match the physical camera 130 position and orientation, a virtual scene is created that matches the real-world view of the physical camera 130. The underlying geospatial features in the virtual world of the virtual camera 114 become aligned with their physical world counterparts once the two images are intersected. The visualization tool 110 renders the geospatial data to place the geospatial features in the virtual world so that the scene in the virtual world matches or aligns with the real world scenes shown by the video frames of the camera 130. In embodiments, the visualization tool 110 applies a three-dimensional mathematical transformation and uses the camera position and orientation information 134 and the geospatial data 122 to position the virtual camera 114. By performing this transformation, the visualization tool 110 aims the virtual camera 114 within the visual visualization space of the visualization tool 110 (the virtual world described above) so that it mimics the view of the real, physical camera 130 that is the source of the actual video.

The visualization tool 110 contains logic to perform this transformation from real-world coordinates and parameters into the coordinate system defined within the visualization tool 110. The real world position of the camera, including latitude, longitude, altitude, horizontal/vertical orientation, and zoom are programmatically input into the visualization tool 110 which mathematically transforms the parameters into the values needed to aim the virtual camera 114 within the virtual world.

The mathematic position transformation requires that the real world coordinates of the camera 130, expressed as spherical coordinates of latitude (lat), longitude (lon), and altitude (alt), be converted into Cartesian coordinates in the OpenGL environment. The values lat and lon are expressed in decimal degrees and alt is meters above Mean Sea Level (MSL). Lat and lon are based on the World Geodetic System (WGS) 84 model for the Earth's shape. WGS 84 is a standard from the National Geospatial-Intelligence Agency (NGA) (formerly the National Imagery and Mapping Agency (NIMA)) published in the Technical Report "Department of Defense World Geodetic System 1984" Third Edition Amendment 1, Jan. 3 2000. Values in different units or Earth model may be converted using standard geographic conversion routines.

The transformation described here is a common method for converting real-world coordinates into a position in a virtual space. The OpenGL environment in the geospatial application assumes a "unit sphere" model for the Earth where the origin is at the center and the diameter of the sphere is 1. The coordinate transform operation accounts for the fact that the Earth is not a true sphere. The transformation uses the following algorithm:

N is the radius of curvature in a plane perpendicular to the meridian and perpendicular to a plane tangent to the surface a is the equatorial radius as defined in WGS84 (Semi-major Axis), b is the polar radius as defined in WGS84 (Semi-minor Axis), and e is the eccentricity of the ellipsoid $a = 6378137 0.0$ $b = 6356752.3142$ $e = \text{sqrt}(1.0 - (b^2)/(a^2))$ $\text{lon} = \text{lon} * (\pi/180)$ $\text{lat} = \text{lat} * (\pi/180)$ $N = a/\text{sqrt}(1.0 - e^2 * \sin(\text{lat})^2)$ $F = 1.0 + ((N/a) - 1.0) + (\text{alt}/a)$ $x = \cos(\text{lat}) * \cos(\text{lon}) * F$ $y = \cos(\text{lat}) * \sin(\text{lon}) * F$ $z = \sin(\text{lat}) * F.$ The virtual camera position in the OpenGL space in the visualization tool is x, y, z. The locative video software then applies rotation (degrees from North), tilt (degrees from horizontal), and focal length from the real-world camera to the virtual camera.

For example, if the physical camera 130 views the ground from an aircraft, the virtual camera 114 in the visualization tool 110 views the same patch of ground, and shows the geographic features associated with the ground, such as roads, infrastructure, units, or other available data.

The locative video software 140 periodically requests a geospatial snapshot 112 of the virtual camera's view from the visualization tool 110. The geospatial snapshot 112 captures an image of the geospatial data 122 available from the geospatial data repository 120. Because the view from the virtual camera 114 inside the visualization tool 110 mimics the view of the real, physical camera 130, this geospatial snapshot covers the same area and all of the geographic features match the real world features they represent (as limited by the accuracy of the geospatial data). The size of the requested geospatial snapshot 112 may be scaled to match the resolution of the video frames 132 in the video stream. The rate of geospatial snapshot requests may be dependent on the performance of the locative video software 140 and the rate of updates to the geospatial data 122 and the camera position information 134.

Higher rates of geospatial snapshot requests may affect the performance of the streaming video output. Therefore, the locative video software 140 may balance video streaming against update rates.

The geospatial snapshot 112 may be modified to make background portions of the geospatial snapshot 112 transparent. The data in the visualization tool 110 is displayed on a background map surface that is of a single color. If the geospatial snapshot 112 generated from this display is directly applied to the video frames 132, this background map surface color may obscure the video data in the video frame 132. The embodiment of the system 100 may programmatically set the background pixels to a value that is recognized as transparent, so that this background color does not obscure the video. With the geospatial snapshot 112 modified as such, the video information may be visible with the geographic features drawn on top. The modified geospatial snapshot 112 may be added to each video frame 132 of the video stream, and the resulting video frames may be assembled into a combined video stream 150 using a desired video encoding format. The resulting video may use a standard codec that works with the operator's client video monitoring application, so no modifications are needed to that application. Any non-proprietary streaming video codec can be used, such as Moving Picture Experts Group-4 (MPEG-4).

The locative video software 140 combines the video frames 132 and the geospatial snapshots 112 to generate the combined video stream 150, as shown in block 144. The combined video stream 150 provides a viewer, i.e., operator or user, with a combination of both the video frames 132, which may be a real time video stream, and supplemental information, such as the referential geospatial data 122 available from the geospatial data repository 120, to enhance the operator's decision making and understanding of the situation shown in the real time video stream. For example, an operator monitoring a surveillance camera in a municipal operations center can see the video frames 132 from a surveillance camera 130 labeled with locations of critical infrastructure items that are both within the field of view of the surveillance camera 130 and that support the operator's mission for security monitoring. Similar, in a military domain, an operator or analyst viewing video coming from a unmanned aerial vehicle (UAV) can see recent reports regarding significant activities in the area displayed in the video.

The embodiments of the system 100 may enable the identification of stationary or moving objects in a video stream by providing supplemental information, such as text and/or symbolic labels to individual features in the video stream. Features in video streams are often difficult to distinguish from one another due to poor video resolution, slow frame rates, crowded scenes or obstructions.

Figure 2:
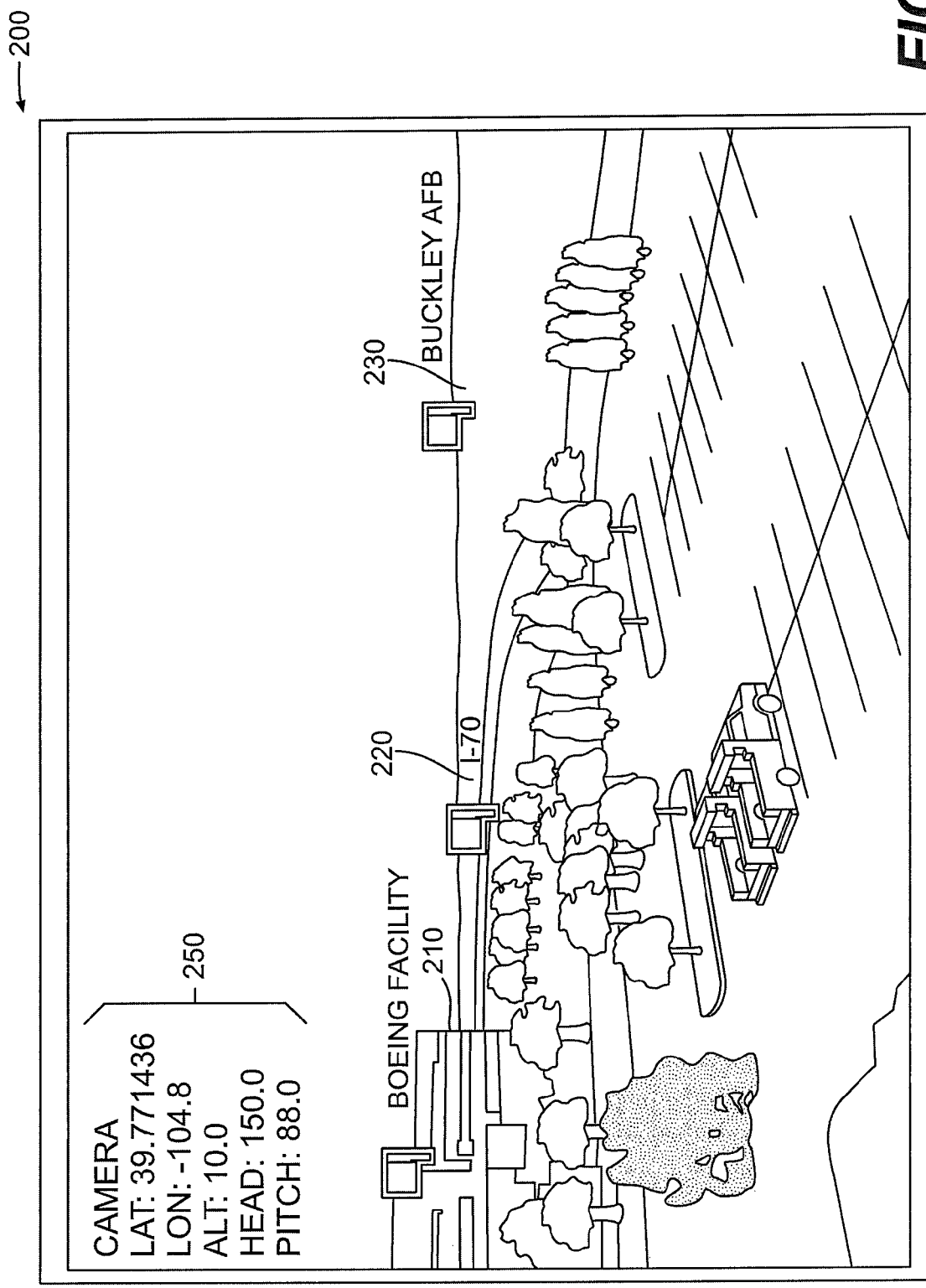
FIG. 2 illustrates an exemplary view of a combined video stream that may be generated by the embodiment of the system of FIG. 1 for a combined video stream with geospatial information.

FIG. 2 illustrates an exemplary view 200 of a combined video stream 150 that may be generated by embodiments of the system 100 for a combined video stream with geospatial information. For example, a human operator observing the output of a stationary camera focused on a large parking lot may not be able to distinguish one vehicle from another. The poor quality of the video stream combined with hundreds of vehicles may make it nearly impossible to differentiate one vehicle from the rest. If the vehicles are equipped with the appropriate global positioning system (GPS) transmitting technology, the system 100 may provide supplemental information in textual format, such as the latitude, longitude, and altitude information 250 of a vehicle, and other nearby landmarks, 210, 220, 230. As a result, embodiments of the system 100 may label one or more features of the video stream (vehicles in this example, not labeled in FIG. 2) to assist an operator with his surveillance and analysis missions.

Embodiments of the system 100 also support analysis of video streams from airborne platforms. An operator may view one or more video streams that show an area of interest on the ground. If the operator's view does not include identifiable features of interest, it may be difficult for the operator to know exactly what a scene portrays. For example, a video may contain an open desert or other natural terrain without clearly defined landmarks, or dense urban areas where the resolution of the video streams does not clearly show identifiable buildings. In some cases the landmarks may be visible, but the operator does not have the knowledge of the local terrain to use the landmarks to orient his/her perception. Embodiments of the system 100 may add supplemental information to the operator's view to mitigate this problem for the operator.

Figure 3:
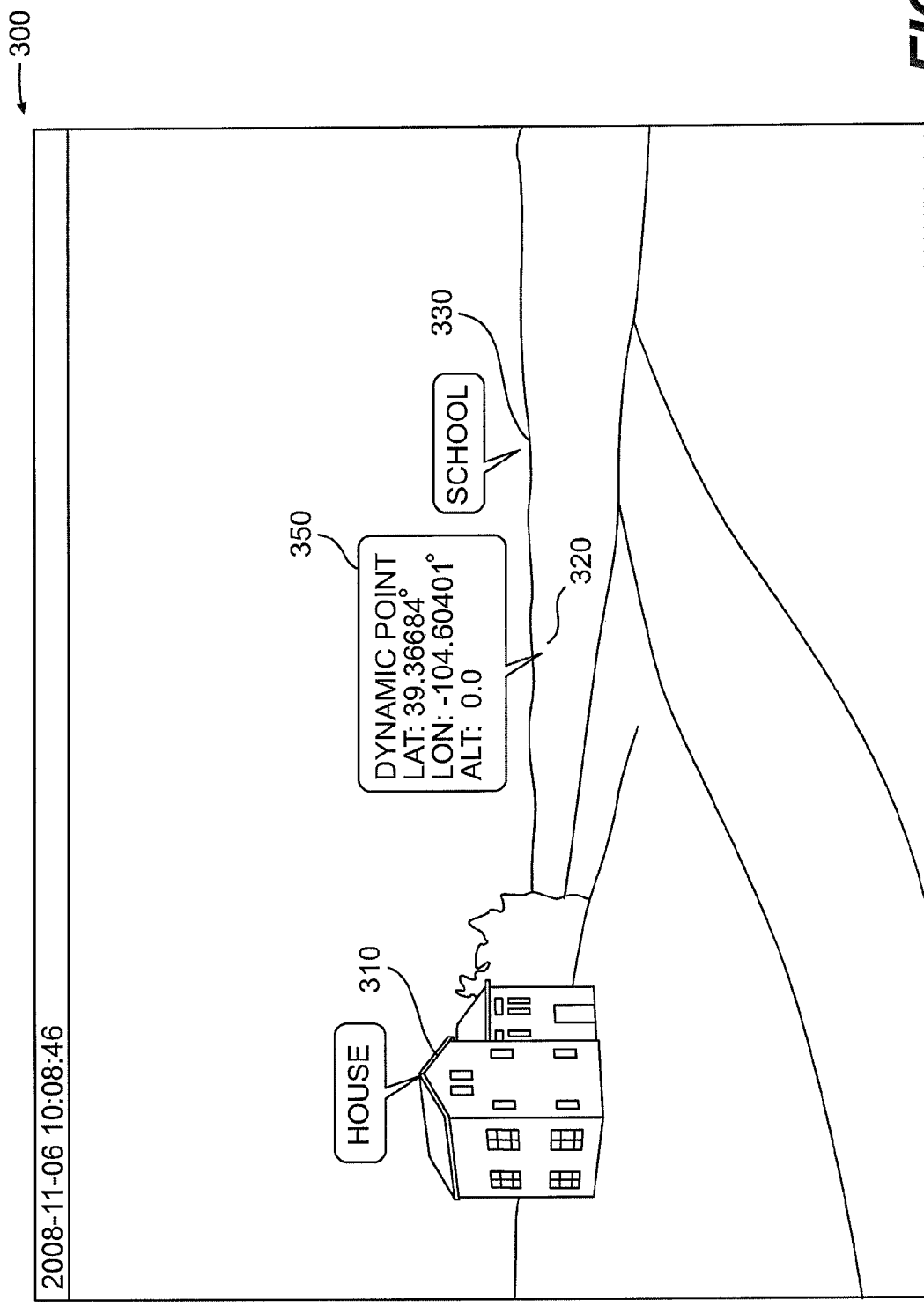
FIG. 3 illustrates another exemplary view of the combined video stream that may be generated by the embodiment of the system of FIG. 1 for a combined video stream with geospatial information.

FIG. 3 illustrates another exemplary view 300 of a combined video stream 150 that may be generated by embodiments of the system 100 for a combined video stream with geospatial information. This exemplary view 300 demonstrates the overlay of geospatial data 112 on the video frames 132 of a streaming video. In the example shown, the geospatial data 112 provides text showing the latitude, longitude, and altitude information 350 of a vehicle 320, as well as text showing nearby landmarks, such as a house 310 and a school 330. The exemplary view 300 may be generated using, for example, an Axis 210™ video camera as the camera 130, National Aeronautic and Space Administration's (NASA) WorldWind™ as the visualization tool 110, and geospatial data 122 stored in keyhole markup language (KML) in the geospatial data repository 120. The camera 130 may be used in a fixed position, and the position parameters may be determined manually using a compass and GPS. NASA's World-Wind™ is an exemplary open source application that controls the virtual camera 114. KML is a common format for exchange of geospatial data 122. The locative video software 140 that combines the video frames 132 with the geospatial snapshots 112 may be written in Java.

Embodiments of the system 100 may provide additional visual information for the operators, giving them in-depth understanding of the scene portrayed in the video stream. Embodiments of the system 100 may be lightweight and less computationally intensive than other mechanisms for determining the geospatial coverage of a video source, such as ortho-rectification. Consequently, a small hardware platform is needed. Embodiments of the system 100 may use geospatial visualization for rendering geospatial features, thus preventing re-engineering feature symbolization. Feature symbolization is the process of assigning and rendering the colors, widths, styles and fills to the geospatial features that comprise a map or globe. These features are generally stored as vectors in the data source, as opposed to images. As vectors they contain coordinate and topology information, but not information for visual appearance on the screen. A road may consist of a series of points that are assumed to be connected, and attribution such as number of lanes, surface type, etc. In embodiments, the visualization tool 110 is responsible for drawing the feature based on the feature type and attributes. Geospatial visualization applications support customizable, often complex symbols for geographic features. For example, roads may be symbolized depending on the surface type, e.g., a dashed black line for dirt roads, a solid black line for two lane roads, and a thick red line for highways. These symbols follow cartographic conventions and/or standards to provide an easy way for operators to rapidly understand map features displayed on the combined video stream 150. Military Standard (MILSTD) 2525B and the GeoSym are used throughout the military to represent geographic features, military units, events, and plans using complex symbols. Embodiments of the system 100 may also use labels, such as road name, unit strength, or event type to show additional information to the operator. Commercial and open source geospatial visualization applications include tools to build this type of symbology. Embodiments of the system 100 may use this capability to draw the geographic elements without having to re-engineer support for these complex symbols. Embodiments of the system 100 may be device and software independent for cameras, video types, and geospatial data.

Figure 4:
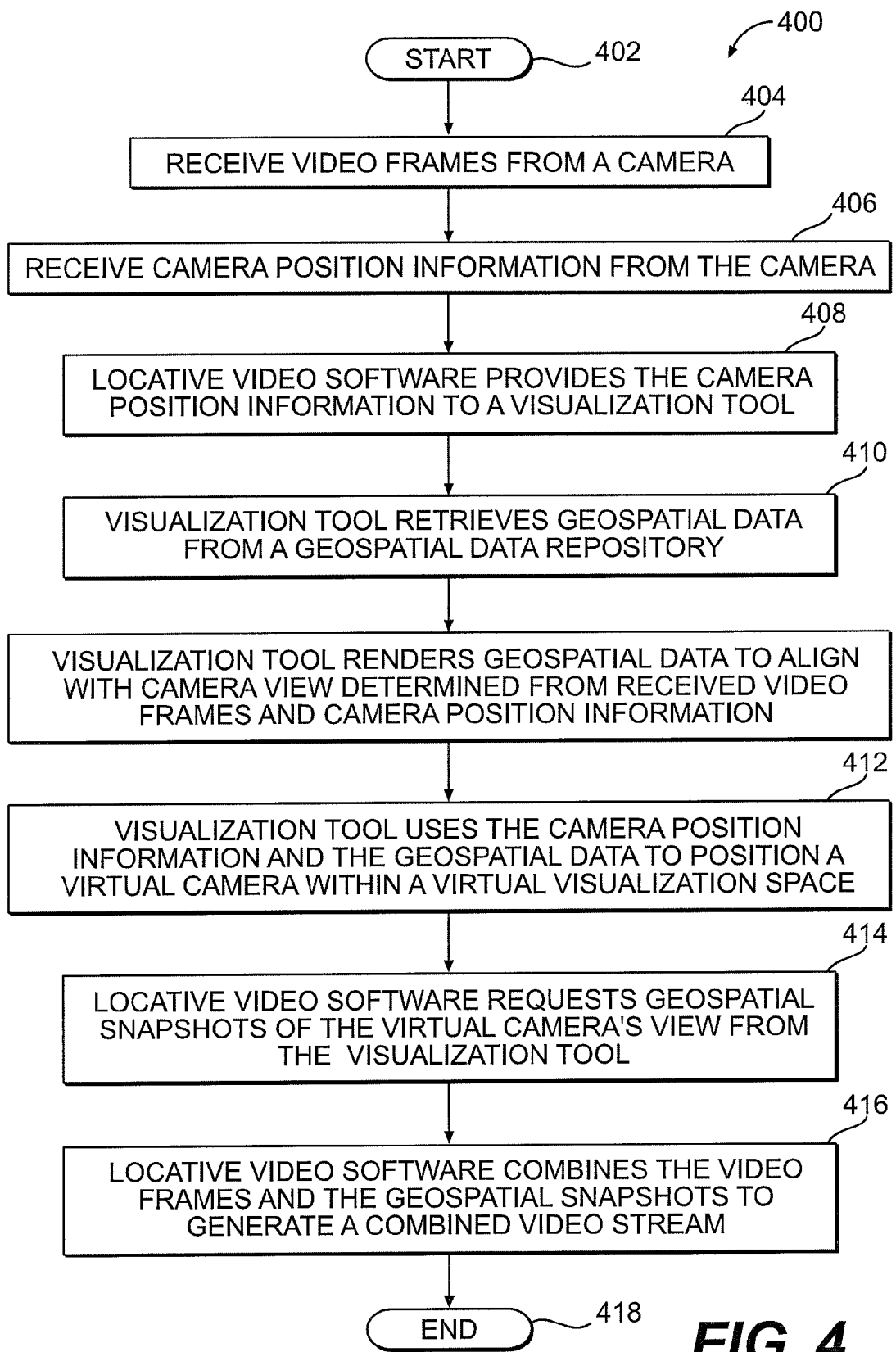
FIG. 4 is a flow chart illustrating an embodiment of a method for providing a combined video stream with geospatial information.

FIG. 4 is a flow chart illustrating an embodiment of a method 400 for providing a combined video stream with geospatial information. The method 400 starts at 402. The locative video software 140 receives the video frames 132 from the camera 130 (block 404) and receives the camera position information 134 from the camera (block 406). The locative video software provides the camera position information 134 to the visualization tool 110 (block 408). The visualization tool 110 retrieves geospatial data 122 from a geospatial data repository 120 (block 410). The visualization tool 110 renders the geospatial data to align the geospatial data with a camera view determined from the received video frames and the camera position information (block 411). The visualization tool 110 uses the camera position information 134 and the rendered geospatial data 122 to position the virtual camera 114 within a virtual visualization space (block 412). The locative video software 140 requests geospatial snapshots 112 of the virtual camera's view from the visualization tool 110 (block 414) and combines the video frames 132 and the geospatial snapshots 112 to generate a combined video stream 150 (block 416). The method 300 may end at 418 or be repeated for additional video streams.

Figure 5:
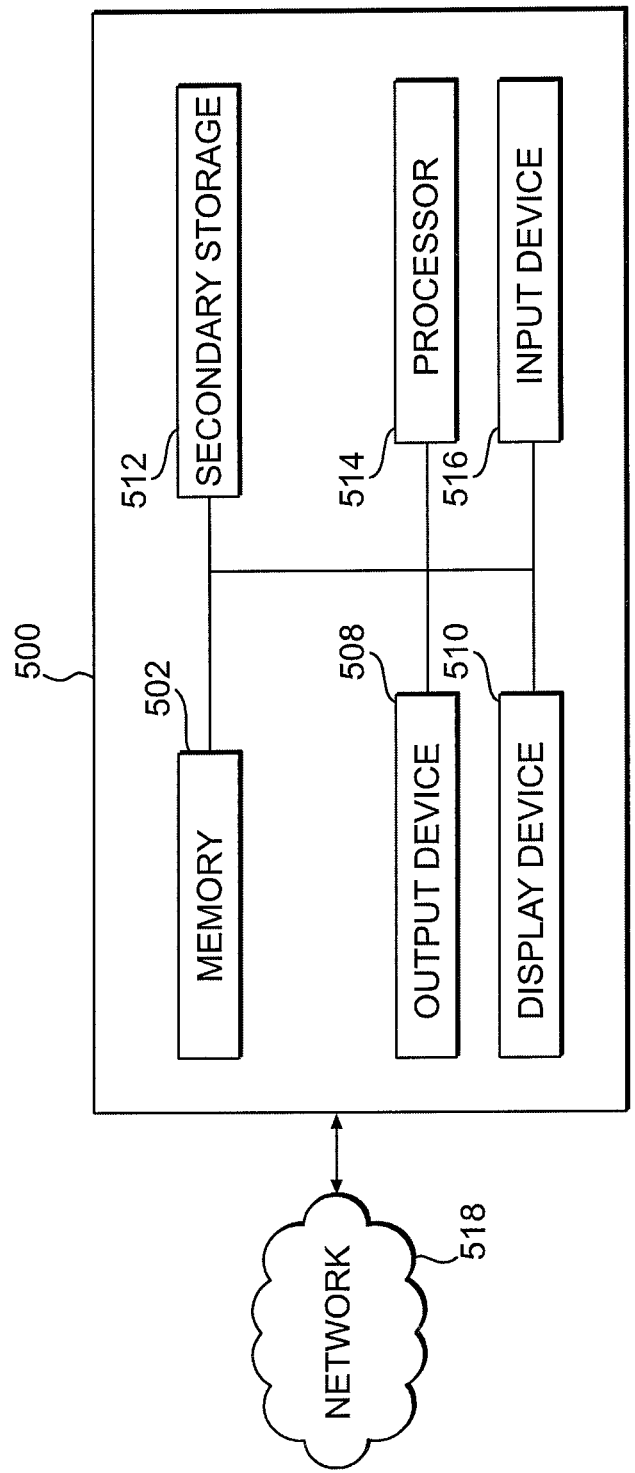
FIG. 5 illustrates exemplary hardware components of a computer that may be used in connection with the exemplary method for providing a combined video stream with geospatial information.

FIG. 5 illustrates exemplary hardware components of a computer 500 that may be used in connection with the exemplary method 400 for providing a combined video stream with geospatial information. The computer 500 includes a connection with a network 518 such as the Internet or other type of computer network. The computer 500 typically includes a memory 502, a secondary storage device 512, a processor 514, an input device 516, a display device 510, and an output device 508.

The memory 502 may include random access memory (RAM) or similar types of memory. The secondary storage device 512 may include a hard disk drive, floppy disk drive, CD-ROM drive, or other types of non-volatile data storage, and may correspond with various databases or other resources. The processor 514 may execute information stored in the memory 502, the secondary storage 512, or received from the Internet or other network 518. The input device 516 may include any device for entering data into the computer 500, such as a keyboard, keypad, cursor-control device, touch-screen (possibly with a stylus), or microphone. The display device 510 may include any type of device for presenting a visual image, such as, for example, a computer monitor, flat-screen display, or display panel. The output device 508 may include any type of device for presenting data in hard copy format, such as a printer, or other types of output devices including speakers or any device for providing data in audio form. The computer 500 can possibly include multiple input devices, output devices, and display devices.

Although the computer 500 is shown with various components, one skilled in the art will appreciate that the computer 500 can contain additional or different components. In addition, although aspects of an implementation consistent with the method for providing a combined video stream with geospatial information are described as being stored in memory, one skilled in the art will appreciate that these aspects can also be stored on or read from other types of computer program products or computer-readable media, such as secondary storage devices, including hard disks, floppy disks, or CD-ROM; or other forms of RAM or ROM. The computer-readable media may include instructions for controlling the computer 500 to perform a particular method.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

What is claimed is:

1. A system for providing a combined video stream with geospatial information, comprising:
   a camera providing a video stream showing a view of the camera and camera position information;
   a geospatial data repository;
   a computer including:
      locative video software that receives video frames of the video stream and the camera position information from the camera; and
      a visualization tool that instantiates a virtual camera and a virtual visualization space, wherein the visualization tool receives the camera position information from the locative video software, retrieves geospatial data from the geospatial data repository, and uses the camera position information and the geospatial data to position the virtual camera within the virtual visualization space by rendering and mathematically transforming, without ortho-rectifying, the geospatial data to align a view of the virtual camera with the camera view such that the virtual camera view mimics the camera view;
   wherein the locative video software periodically requests and receives geospatial snapshots of the virtual camera view from the visualization tool, and combines the video frames and the geospatial snapshots to generate a combined video stream, the geospatial snapshots provide captured virtual camera view images corresponding to the geospatial data retrieved from the geospatial data repository, the combined video stream including information associated with one or more geospatial features in the video frames and nearby landmarks, and wherein the associated information is rendered in geospatial alignment with the one or more geospatial features.

2. The system of claim 1, wherein the locative video software creates the combined video stream without geo-referencing the video frames of the video stream to intersect the video stream with the geospatial data.

3. The system of claim 1, wherein the locative video software generates the combined video stream without analyzing the video stream of the camera.

4. The system of claim 1, wherein the geospatial data repository is one of a local database, a remote database, and a data service.

5. The system of claim 1, wherein the geospatial data is information regarding particular locations, including terrain features, man made features, and time sensitive event data.

6. The system of claim 1, wherein the geospatial data is collected and visualized using geospatial information systems (GIS) and stored in a variety of formats and technologies.

7. The system of claim 1, wherein the video frames show real time pictures of activities within the camera field of view (FOV).

8. The system of claim 1, wherein the video frames are previously recorded.

9. The system of claim 1, wherein the camera position information includes the camera's position, orientation, and field of view (FOV) information.

10. The system of claim 1, wherein a size of the geospatial snapshot is scaled to match a resolution of the video frames.

11. The system of claim 1, wherein a rate of the requests is dependent on the performance of the locative video software and the rate of updates to the geospatial data and the camera position information.

12. The system of claim 1, wherein the information associated with one or more geospatial features in the video frames includes latitude, longitude, and altitude information of the one or more geospatial features in the video frames.

13. A method for providing a combined video stream with geospatial information, the method being executed by a computer including a processor and comprising:
    receiving video frames and camera position information from a camera;
    providing the camera position information to a visualization tool that is executed by the processor;
    retrieving geospatial data from a geospatial data repository using the visualization tool;
    rendering and mathematically transforming, without ortho-rectifying, the geospatial data to align with a camera view determined from the received video frames and the camera position information;
    positioning a virtual camera within a virtual visualization space of the visualization tool, using the camera position information and the rendered geospatial data, wherein the virtual camera provides a view mimicking that of the camera;
    periodically requesting, using locative video software, geospatial snapshots of the virtual camera's view from the visualization tool, the geospatial snapshots provide captured virtual camera view images corresponding to the geospatial data retrieved from the geospatial data repository; and
    combining the video frames and the geospatial snapshots to generate a combined video stream using the locative video software, wherein the combined video stream includes information associated with one or more geospatial features in the video frames and nearby landmarks, and wherein the associated information is rendered in geospatial alignment with the one or more geospatial features.

14. The method of claim 13, wherein the video frames show real time pictures of activities within the camera's field of view (FOV).

15. The method of claim 13, wherein the camera position information includes the camera's position, orientation, and field of view (FOV) information.

16. The method of claim 13, wherein the information associated with one or more geospatial features in the video frames includes latitude, longitude, and altitude information of the one or more geospatial features in the video frames.

17. A non-transitory computer readable medium providing instructions for providing a combined video stream with geospatial information, the instructions comprising:
    receiving video frames and camera position information from a camera;
    providing the camera position information to a visualization tool that is executed by the processor;
    retrieving geospatial data from a geospatial data repository using the visualization tool;
    rendering and mathematically transforming, without ortho-rectifying, the geospatial data to align with a camera view determined from the received video frames and the camera position information;
    positioning a virtual camera within a virtual visualization space of the visualization tool, using the camera position information and the rendered geospatial data, wherein the virtual camera provides a view mimicking that of the camera;
    periodically requesting, using locative video software, geospatial snapshots of the virtual camera's view from the visualization tool, the geospatial snapshots provide captured virtual camera view images corresponding to the geospatial data retrieved from the geospatial data repository; and
    combining the video frames and the geospatial snapshots to generate a combined video stream using the locative video software, wherein the combined video stream includes information associated with one or more geospatial features in the video frames and nearby landmarks, and wherein the associated information is rendered in geospatial alignment with the one or more geospatial features.

18. The system of claim 1, wherein the geospatial snapshots comprise entire video frames.

19. The system of claim 1, wherein the view of the camera is not downward.

20. The system of claim 1, wherein the view of the camera contains horizon or skyline.

21. The method of claim 13, wherein the geospatial snapshots comprise entire video frames.

22. The method of claim 13, wherein the view of the camera is not downward.

23. The method of claim 13, wherein the view of the camera contains horizon or skyline.

24. The non-transitory computer readable medium of claim 17, wherein the geospatial snapshots comprise entire video frames.

25. The non-transitory computer readable medium of claim 17, wherein the view of the camera is not downward.

26. The non-transitory computer readable medium of claim 17, wherein the view of the camera contains horizon or skyline.

27. The system of claim 1 wherein the virtual visualization space is a three-dimensional space.

* * * * *